No. 735,577. PATENTED AUG. 4, 1903.
C. G. PERKINS.
HANDLE FOR ELECTRIC SWITCHES.
APPLICATION FILED JUNE 10, 1903.
NO MODEL.

Witnesses:
E. M. Lowe.
C. W. Sponsel.

Inventor:
Charles G. Perkins, by
Harry R. Williams
atty.

No. 735,577. Patented August 4, 1903.

UNITED STATES PATENT OFFICE.

CHARLES G. PERKINS, OF HARTFORD, CONNECTICUT.

HANDLE FOR ELECTRIC SWITCHES.

SPECIFICATION forming part of Letters Patent No. 735,577, dated August 4, 1903.

Application filed June 10, 1903. Serial No. 160,898. (No model.)

*To all whom it may concern:*

Be it known that I, CHARLES G. PERKINS, a citizen of the United States, residing at Hartford, in the county of Hartford and State of Connecticut, have invented certain new and useful Improvements in Handles for Electric Switches, of which the following is a specification.

This invention relates to a snap-switch handle which has a yielding connection with the rotatory switch-spindle.

The object of the invention is to provide a handle of this nature with a yielding connecting mechanism, which will be simple to construct and easy to assemble and which will be strong and durable in use.

This handle has a recess containing a socketed plunger and a spiral spring that thrusts between the head of the plunger and a washer that is arranged to prevent the rotation of the plunger and is held in the mouth of the recess by an expansible ring.

Figure 1:
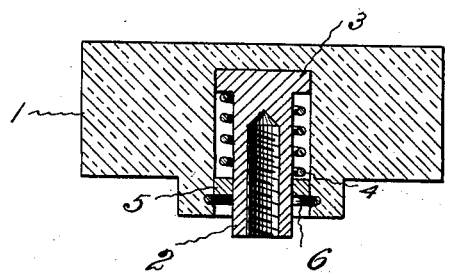
Figure 2:
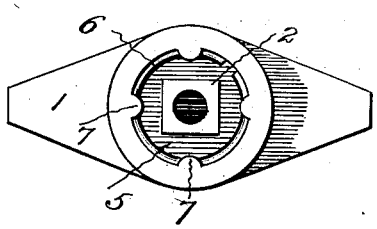
Figure 3:
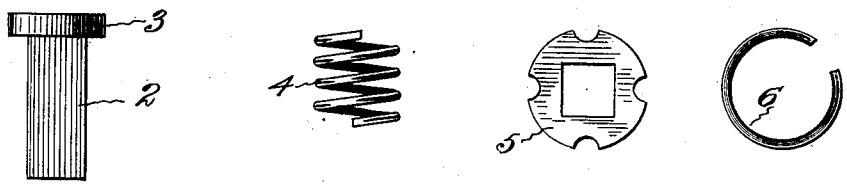

Figure 1 of the accompanying drawings is a central section of this handle. Fig. 2 is a view looking toward the inner face of the handle; and Fig. 3 shows the plunger, spring, washer, and ring.

The body 1 of this handle may be formed to any desired design of porcelain, rubber composition, or other suitable substances. In a central recess in this body is a plunger 2 with an enlarged head 3. The shank of the plunger that is shown in the drawings is square and has a threaded socket in one end for receiving the threaded end of the switch-spindle. A spiral spring 4 is coiled about the plunger and held between the head of the plunger and the washer 5, that is slipped upon the shank of the plunger and fastened in the mouth of the recess by a spring-ring 6, that is allowed to expand into notches in the hubs 7, formed on the wall of the recess outside of the washer. The opening through the washer fits the shank, so as to prevent the plunger from rotating, and the edges of the washer are notched to fit the hubs on the wall of the recess, so that it may be inserted into the recess and when in place will not turn.

In this handle there is no lining or tube molded into or fastened in the recess when the body of the handle is formed. All of the metal parts are formed independently and assembled in the recess after the body of the handle is complete. The plunger, spring, and washer are easily located in the recess and the ring quickly placed outside of the washer and allowed to expand into the notches, so as to hold the parts in position.

All of the parts are cheaply manufactured, and the arrangement is such that they are put together in a substantial manner, and the completed handle is strong and durable and yet has the requisite yielding qualities for correctly holding the cap or cover-plate in position when the handle is screwed upon the spindle of the switch with which it is to be used.

I claim as my invention—

1. A handle consisting of a body of molded material having a central recess containing a non-rotatable plunger, a washer, a spring thrusting between the plunger and the washer, and an expansible ring retaining the washer in position, substantially as specified.

2. A handle consisting of a body of molded material having a central recess containing a plunger with a head and an angular shank, a non-rotatable washer with an opening fitting the shank of the plunger, a spring coiled about the shank and thrusting between the head of the plunger and the washer, and a ring expanded into notches in the wall of the recess outside of the washer, substantially as specified.

CHARLES G. PERKINS.

Witnesses:
HARRY R. WILLIAMS,
ETHEL M. LOWE.